Sept. 9, 1952          H. W. BEALL          2,610,019
AUTOMATIC FAUCET
Filed July 19, 1946          3 Sheets-Sheet 1
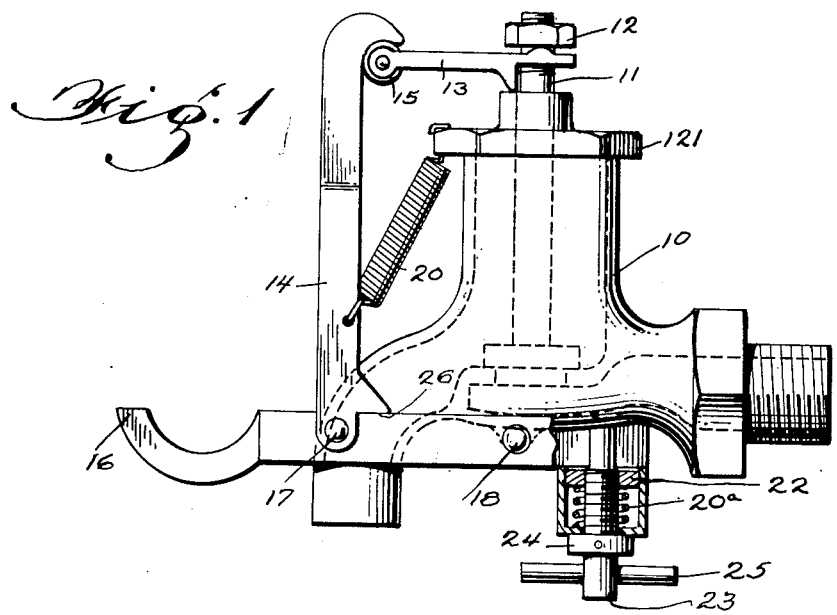
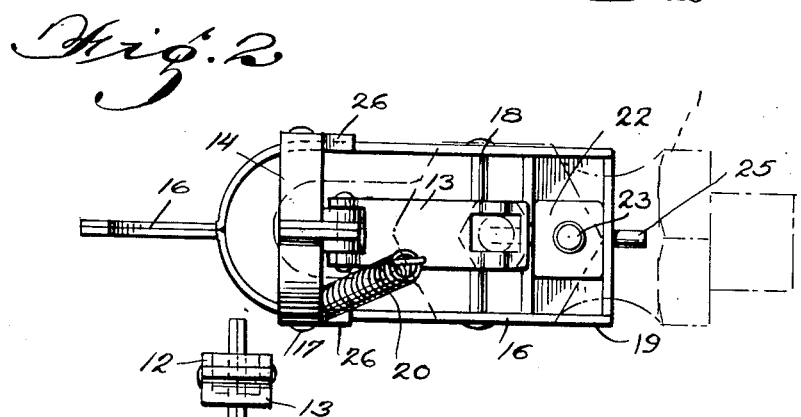
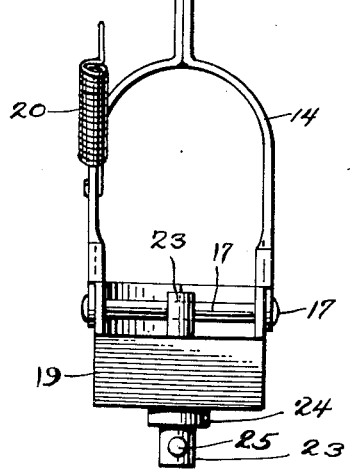
INVENTOR.
Herbert W. Beall
BY
*A. W. Dahn*
ATTORNEY Sept. 9, 1952　　　　　H. W. BEALL　　　　　2,610,019
AUTOMATIC FAUCET
Filed July 19, 1946　　　　　　　　　　　　　3 Sheets-Sheet 2
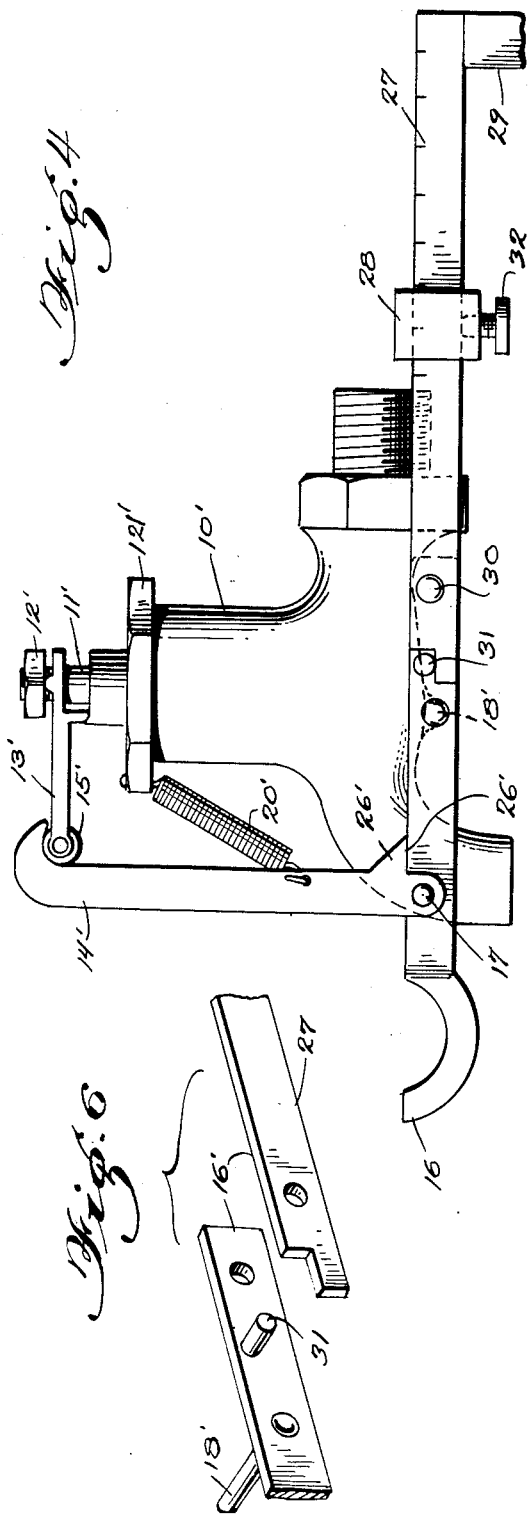
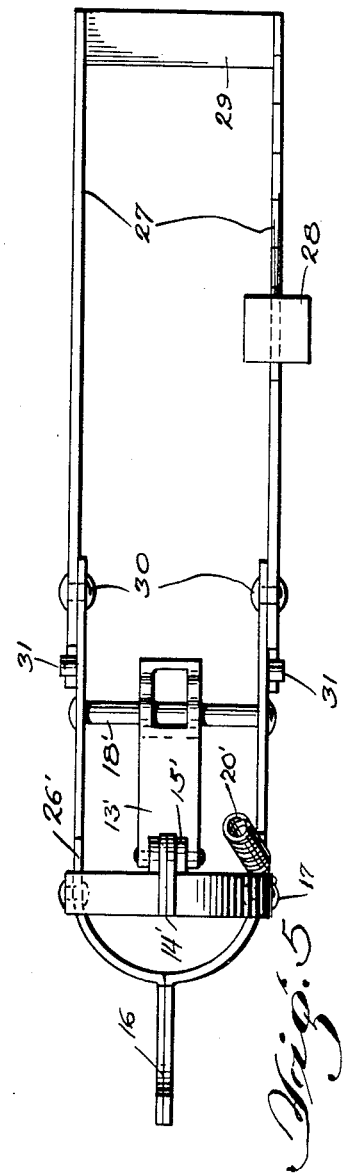
INVENTOR.
Herbert W. Beall
BY
　　　　ATTORNEY Sept. 9, 1952     H. W. BEALL     2,610,019
AUTOMATIC FAUCET
Filed July 19, 1946     3 Sheets-Sheet 3
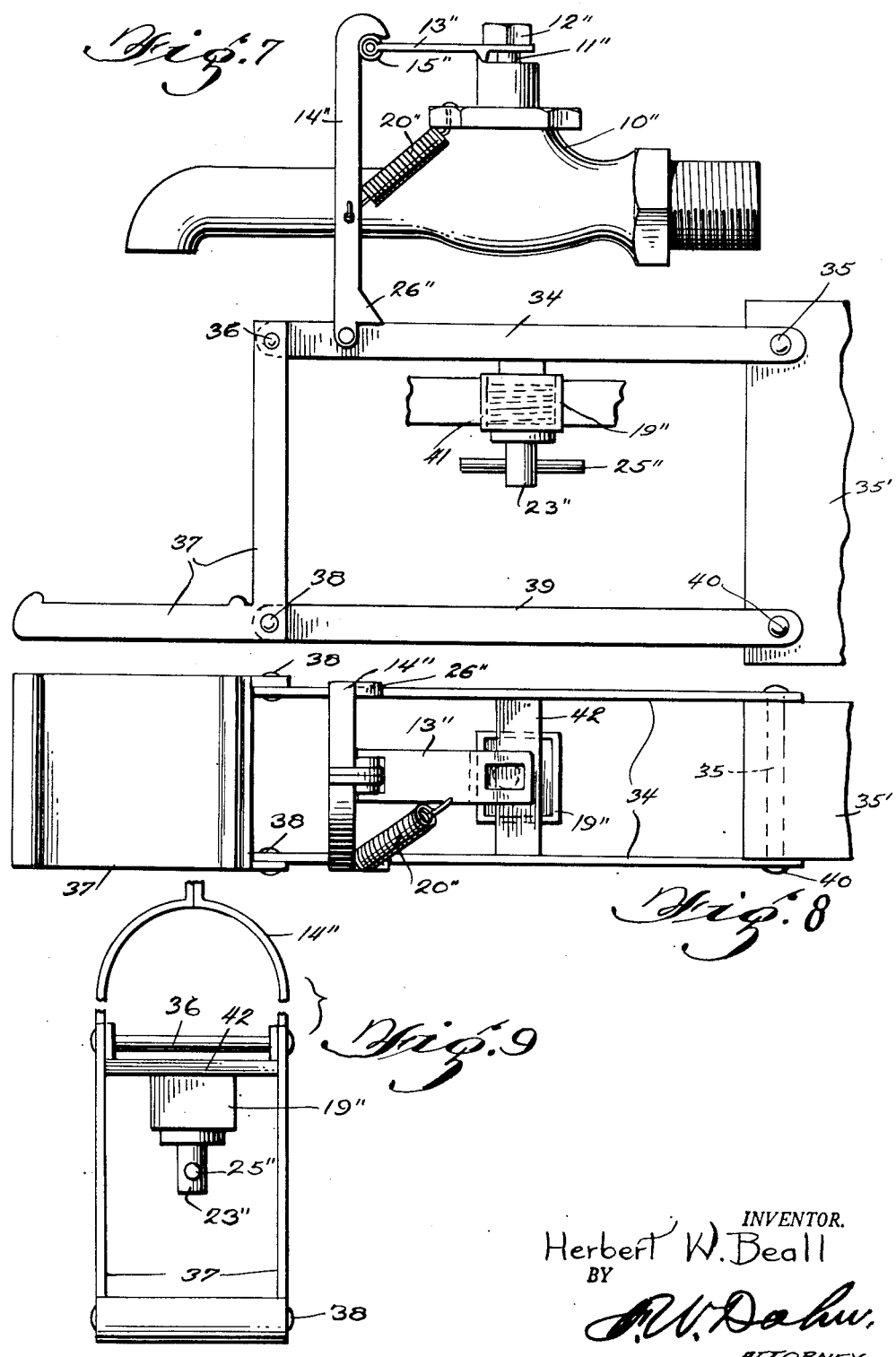
INVENTOR.
Herbert W. Beall
BY
R. W. Dahw.
ATTORNEY Patented Sept. 9, 1952

2,610,019

UNITED STATES PATENT OFFICE 2,610,019

AUTOMATIC FAUCET

Herbert W. Beall, Sumter, S. C.

Application July 19, 1946, Serial No. 684,917

2 Claims. (Cl. 249—58)

My invention relates to automatic faucets and it is an object of the same to provide a faucet with means including a hook or a platform upon which a suitable receptacle can be placed to receive liquid from the faucet.

Another object of the invention is to provide an automatic faucet with means for automatically opening the faucet and automatically closing it again upon completion of the discharge of fluent material of predetermined weight. For example, it is a purpose of my invention to place on the hook or platform a receptacle such as may open the faucet, the apparatus including provisions for forcing the faucet to close when a predetermined quantity of the fluent material has been discharged into the receptacle.

Another object of the invention is to provide mechanism such that a partially emptied receptacle can be placed on the hook or on the platform, and the flow of fluent material thereto will be cut off when the receptacle has again been filled to the previous weight.

Another object of the invention is to provide an automatic faucet of such character that it will not be liable to open and discharge fluent material by accident. Thus it is particularly useful as a safety cut off for oil burners, and other analogous situations.

Another object of the invention is to provide a device of the character described with convenient means for adjusting the same so as to vary the point at which discharge will be interrupted.

Another object of the invention is to provide cut-off means acting with a quick or snap action to interrupt the flow of fluent material sharply when the desired quantity has been received in the receptacle.

Referring to the drawings which are made a part of this application and in which similar reference characters indicate similar parts:

Figure 1 is a side elevation of a faucet with a supporting hook;

Figure 2 is a top plan view of the same, with the faucet in dotted lines;

Figure 3 shows a rear view of the operative mechanism with the faucet omitted;

Figure 4 is a modification in which a weight beam is used instead of a spring;

Figure 5 is a plan view of the operative mechanism of this modification;

Figure 6 is a detailed view of the weight beam connection;

Figure 7 is a side elevation of a modification in which the hook is replaced by a platform and a pair of parallel levers;

Figure 8 shows a plan view of the above modification;

Figure 9 is a front view of this modification.

In the drawings, reference character 10 indicates a faucet of any conventional or desirable type, said faucet including a self-closing valve having a stem 11, with a nut 12 threaded on its upper end. In the embodiment herein illustrated the nut is spaced from the bonnet 121 of the spigot sufficiently to permit a lever 13 to be interposed. The lever 13 carries a roller 15 which is engaged by a hook 14 mounted by means of pivot 17 on the hooked upper end of a detent 16 which is adapted to hold a bucket or other analogous receptacle. A spring 20 is connected at one end to the hook and at the other end to the bonnet 121 so as to draw the hook toward the position shown in Figure 1. The hook 16 is pivoted at 18 on the body of the spigot and carries a casing 19 for a spring 20a. Inside the casing a nut 22 is mounted, the shape of the casing and the nut being such as to prevent rotation of the nut. A stem 23 is threaded in the nut and has a pin 25 for rotating the same, said stem also having a thrust washer 24 that bears against the end of the casing and the end of the stem resting against the underside of the body 10 of the valve. By turning the stem 23 with relation to the nut 22, the spring 20a may be compressed more or less so as to vary its resistance to the movement of the hook 16. Lugs 26 at the lower ends of the two arms of detent 14 bear upon the forks of the hook member 16 at opposite sides of the faucet and its upper end is shaped as a hook to engage over roller 15 and so to lift the valve.

In the operation of the form of the invention shown in Figure 1, a bucket or the like is placed on the hook 16 and by its weight pulls the hook down slightly to open the valve and cause discharge of fluent material from the faucet. The spring 20a may have been compressed previously to offer a suitable amount of resistance to the downward pull on the hook 16. As the weight on the hook 16 increases, the spring 20a is gradually compressed and the hook moves downward about its pivot 18, carrying with it the detent 14, which is forced to move outwardly as it descends, due to the action of the shoulders 26 resting on the rear forked end of hook 16. As the predetermined limit is reached the hook 16 disengages the roller 15 and permits the lever 13 to turn clockwise, releasing the valve 12 to the action of its spring and cutting off the flow of the material from the faucet.

In the form of the invention shown in Figures 4 to 6, the parts 10', 11' etc. may be identical, or substantially so, with similar parts shown in Figures 1 to 3 and the operation is similar. In this form of the invention however, the adjustable spring means at 20a, etc., is omitted, its place being taken by a weight operated device. The last named device includes arms 27 pivotally mounted at 30 on the rearward extending forks of hook 16', the downward movement of said arms 27 relative to those of the hook 16 being limited by lugs 31 engaging forwardly projecting fingers on arms 27. A weight 28 may be slid along an arm 27, to such a position as affords the desired resistance to downward movement of the front end of hook 16 and may be secured in such position by a setscrew 32. The downward movement of the arms 27 is limited by a stop 29, which is secured in fixed position with relation to the arms 27.

In the form of the invention shown in Figures 7 to 9, the parts 10'', 11'' etc. may be identical, or substantially so, with parts shown in the forms of the invention previously described. In this form of the invention a lever 34 is pivoted at 35 on a fixed support 35'. At the front end of lever 34 there is supported by a pivot 36 an L-shaped member 37 whose horizontal arm forms a platform for supporting a receptacle of any suitable character. A link 39 is connected at 38 to member 37 and is pivoted at its other end to the fixed support 35', as shown at 40. In this form of the invention, a compressible spring is utilized for resisting the downward movement of the linkage due to weight on the platform portion of member 37, said spring being enclosed in a casing 19'' as before, which casing is carried by a fixed support 41.

The operation of the devices in Figures 4 to 9 being essentially similar to that of the devices in Figures 1 to 3, it is not thought necessary to explain their operation in detail.

It will be obvious to those skilled in the art that many changes can be made in the devices herein disclosed, all without departing from the spirit of the invention, therefore I do not limit myself to what is shown in the drawings and described in the specification, but only as indicated in the appended claims.

Having thus fully described my invention, what I claim is:

1. An automatic faucet comprising a valve spring-pressed toward closed position, a lever having means for supporting a container in position to receive material from said faucet, a second lever having an arm for opening said valve and a roller on its other arm, an upstanding detent pivotally mounted on the first-mentioned lever, said detent having a hooked upper end adapted to engage said roller in one position, a spring biasing said bar toward said position, a shoulder on the detent for engaging the first-named lever to limit the movement of the detent by said spring, a housing on the arm of the first-named lever remote from the container supporting means, a coil spring in said housing, a screw in said housing coaxial with said spring, said screw bearing at one end against a fixed support, a nut on the screw bearing against one end of said spring, and means at the other end of the screw whereby it may be turned to vary the compression of the spring.

2. An automatic faucet comprising a valve spring-pressed toward closed position, a lever having means for supporting a container in position to receive material from said faucet, a second lever having an arm for opening said valve, an upstanding detent pivotally mounted on the first-mentioned lever, the upper end of said detent being hooked to engage the free end of the first lever, a spring biasing said detent toward engaging position, a shoulder on the detent for engaging the first-named lever to limit the movement of the bar by said spring, a housing on the arm of the first-named lever remote from the container supporting means, a stop for the lever in said housing, a compression spring supporting said stop, and means for adjusting the compression of said spring.

HERBERT W. BEALL.

REFERENCES CITED

The following references are of record in the file of this patent:

UNITED STATES PATENTS

| Number | Name | Date |
|---|---|---|
| 460,423 | Bellasis | Sept. 28, 1891 |
| 635,256 | Kennelly | Oct. 17, 1899 |
| 1,207,783 | Marquadt | Dec. 12, 1916 |
| 1,513,038 | Fortier et al. | Oct. 28, 1924 |
| 1,513,967 | Cozad | Nov. 4, 1924 |
| 1,915,739 | Johnson | June 27, 1933 |
| 2,200,602 | Harriman | May 14, 1940 |
| 2,278,655 | James | Apr. 7, 1942 |

FOREIGN PATENTS

| Number | Country | Date |
|---|---|---|
| 410,078 | Great Britain | 1934 |